Patented Apr. 29, 1941

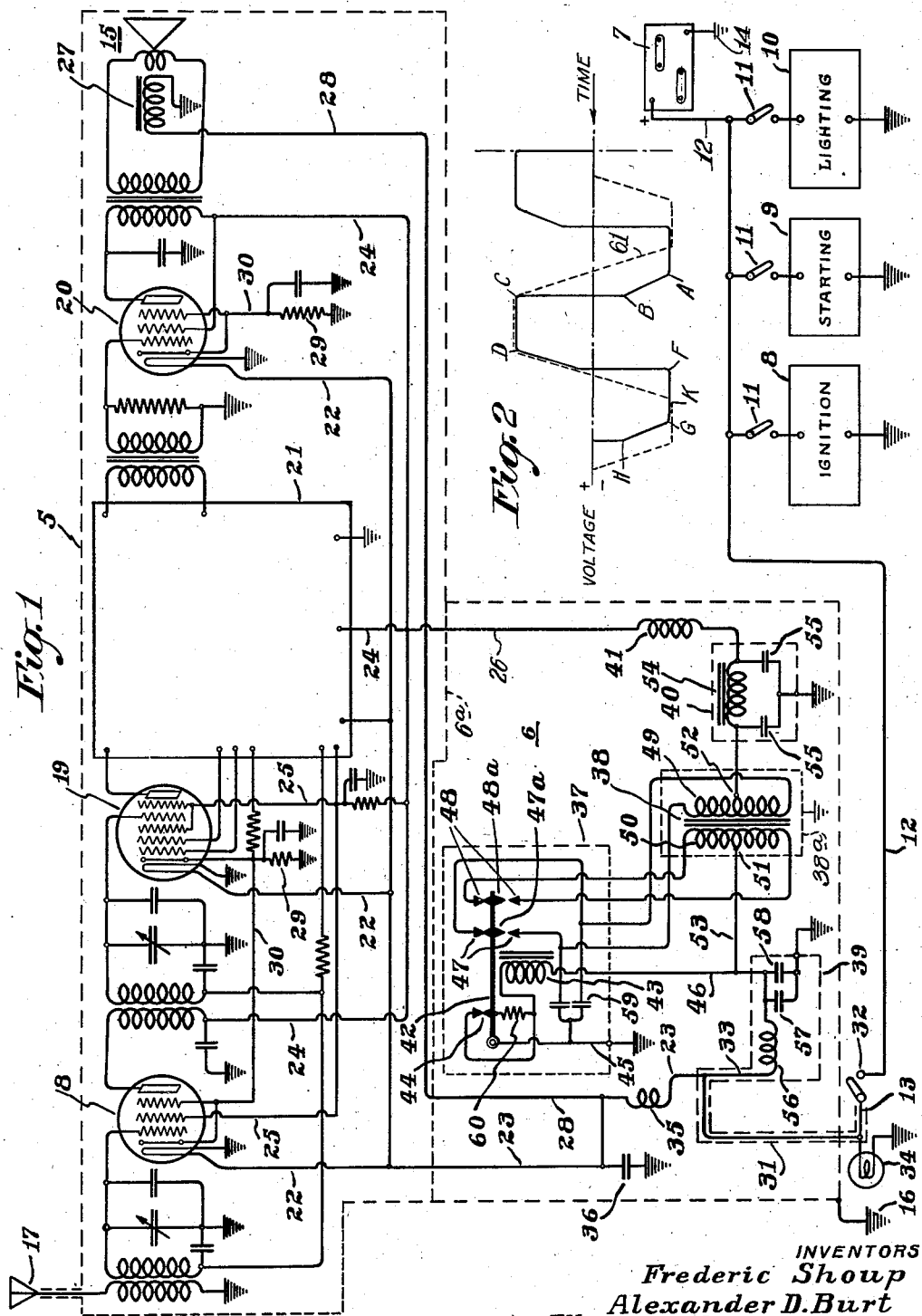

2,240,123

UNITED STATES PATENT OFFICE 2,240,123

POWER SUPPLY SYSTEM

Frederic Shoup, Oaklyn, N. J., and Alexander D. Burt, Narberth, Pa., assignors to Radio Corporation of America, New York, N. Y., a corporation of Delaware Application September 16, 1933, Serial No. 689,720

5 Claims. (Cl. 171—97)

The present invention relates to power supply systems for radio receiving apparatus and the like, and has for its primary object to provide an improved supply system of that character which is adapted to operate in connection with a low voltage battery as the sole source of operating current for the apparatus.

Battery operated power supply systems are at present of increasing commercial importance in connection with automobile radio receivers and the like, and in accordance with the invention, are provided with means whereby the usual 6–8 volt or other storage battery source of ignition, starting and lighting current, may be utilized successfully as the source of operating current for all circuits of the entire radio receiving or similar apparatus.

Heretofore, various supply systems have been employed in providing battery operated radio apparatus of the automobile receiver type with suitable operating current from low voltage battery sources. In a major portion of installations in automotive vehicles, boats, and isolated locations, however, the problem of power supply has been solved to a limited extent by the use of low voltage batteries, such as an ordinary storage battery, for filament or heater excitation, with "B" batteries and "C" batteries for supplying the necessary anode and grid potentials. However, the short life, added weight and other disadvantages inherent in the use of such batteries in general are not compensated by the simplicity of the installation.

In certain other installations, and as an improvement over the use of "B" batteries, motor-generator units have been employed for raising low voltage direct current from the storage battery, to either standard alternating current such as is ordinarily available for house lighting, or to direct current at suitable potentials directly for the circuits of the radio apparatus. In either case, however, a motor-generator device is involved, with additional initial expense for that item of the system.

It is, therefore, a further object of the present invention to provide an improved power supply system for radio and like apparatus which may be operated directly from a low voltage or automobile storage battery as the sole source of power for all circuits of the apparatus, without the use of "B" batteries and without the use of motor-generator equipment for transforming the battery current.

In carrying the invention into effect, a simple vibrator-rectifier system is employed, and is so arranged that high frequency disturbances, heretofore considered as unavoidable as the result of operation of vibrators, are prevented from interfering with the operation of the radio apparatus.

This is for the reason that in an automobile, for example, the vibrator-rectifier system receives current from the automobile battery and is thereby connected with the wiring which extends throughout the automobile chassis. It is also connected with all of the circuits of the radio apparatus. The radio apparatus, therefore, may pick up interference from the vibrator system both directly and as radiated from the wiring of the chassis of the automobile.

It is known that an electrical vibrator of the "make and break" contact type may generate oscillations within a wide frequency range extending throughout both the audio and radio frequency ranges, even into the ultra high frequency range, so that radio interference from vibrator type rectifiers has been considered as both difficult and costly to eliminate.

It is, therefore, a further object of the present invention to provide an improved power supply system for radio receiving apparatus and the like of the vibrator-rectifier type wherein the radio interference therefrom, ordinarily experienced, is substantially eliminated.

In carrying into effect the above and other objects of the invention, the vibrator-rectifier system is electrically isolated from the chassis wiring of the automobile, including the power source or battery, as is also the filament heating and the plate supply systems for the radio apparatus from both the vibrator-rectifier system and the chassis wiring. This is accomplished by properly separating the supply system into suitable units and by providing separate filtering at certain points in the supply system in connection with said units. Interference from the vibrator system is thereby substantially eliminated from the radio apparatus, which may be utilized in connection with a single battery source of power.

While the invention relates primarily to automotive or automobile radio receiving systems adapted for connection with the 6 volt storage battery ordinarily provided therein, it is not limited thereto, but may be embodied in any radio power supply system for connection with any direct-current source, at a suitable potential, adapted to provide a relatively heavy operating current over such periods of time as such apparatus is ordinarily operated. The invention will, however, be better understood from the following description when taken in connection with the accompanying drawing, and its scope will be pointed out in the appended claims.

In the drawing, Fig. 1 is a schematic circuit diagram of a radio receiver provided with a power supply system embodying the invention, and Fig. 2 is a curve diagram illustrating the operation of the power supply system of Fig. 1.

Referring to Fig. 1, the dotted outline indicated at 5 represents a shielded radio receiver unit, to which is connected a power supply unit 6, in turn connected with a single source of operating current or power 7. The receiver indicated may be considered as an automobile radio receiver, with the power supply means 7 provided by the automobile storage battery. The battery also supplies the usual ignition, starting and lighting systems represented by the rectangles 8, 9 and 10, respectively, and the operating switches 11, by which said systems are connected with the battery through the supply or chassis wiring of the vehicle, indicated generally at 12.

In the present example, the receiver 5 is fully enclosed and shielded, as indicated by the dotted outline, as a single unit with the supply unit 6 and a loud speaker device 15. The supply unit may also be enclosed by extending the shielding as indicated at 6a. A suitable ground connection indicated at 16 and two connection leads only are required for the receiver. The two leads include a shielded antenna or signal input lead 17, and the battery or power supply lead 13. The ground connection is made in any suitable manner, as by mounting the apparatus in the vehicle on the frame, thereby simplifying the installation of such apparatus. It will, therefore, be seen that such installation involves merely securing the receiver in place in the desired location and making two lead connections.

The ground connections to the chassis, however, represent any suitable common return circuit for the various circuits of the apparatus and the power supply source or battery 7. It should be understood that such connections may be made to any other common conducting return means other than the metallic chassis of the vehicle or of the receiving apparatus. All wiring connections are preferably grounded and, accordingly, the grounded chassis return system as a preferred embodiment is shown in the drawing.

By way of example, the receiver 5 is provided with the usual electric discharge devices or tubes and circuits therefor, including a radio frequency amplifier device or tube 18, a second device or tube 19 in cascade connection therewith, which second tube may be a combined detector and oscillator, and an output device or tube 20 connected with the loud speaker device 15. Intermediate apparatus and tube circuits which do not primarily concern the invention are indicated by the block diagram 21. The tubes are provided with suitable filament or heater supply leads 22 having grounded return connections as indicated, and are connected with a filament or heater supply lead 23 from the supply unit 6. The tubes are also provided with suitable anode potential supply leads indicated at 24, and screen grid potential supply leads indicated at 25, connected with an anode or positive "B" supply lead 26 from the supply unit 6.

The loud speaker device 15 may be of the electrodynamic type and may also be provided with a suitable field winding indicated at 27. This is also connected with the filament or heater supply lead 23 through a supply lead indicated at 28.

With further reference to the supply circuits, it will be noted that the tubes are arranged to be provided with grid bias potentials from self-bias resistors 29 in the cathode return leads 30 of the tubes indicated. This is a preferred arrangement for bias potential supply, since the circuits are simplified, and shortened in the apparatus, and the anode potential available is sufficiently high, whereby the bias potentials may be obtained in this manner.

The low voltage storage battery current is supplied to the receiver through the receiver power supply lead 13 which extends through a grounded shield, indicated at 31, and a power switch 32 for the apparatus, which switch may be remotely located. Connected with the lead 13 from power switch 32 is the filament or heater supply lead 23, and a vibrator supply lead 33, forming branch circuits from the power switch and the lead 13. A suitable pilot light is also connected from the power switch to ground at the remote location as indicated at 34.

Interposed in the filament or heater supply lead 23 is a high frequency filter choke coil 35 comprising, in one embodiment of the invention, a few turns of wire and a suitable by-pass capacitor connected to the output or filament end of the choke coil between the lead 23 and ground, as indicated at 36. The functions of this coil and condenser filter will hereinafter be described. Generally, it is an ultra high frequency filter for ignition and vibrator electric disturbances located at a point in the system where it has maximum effect for eliminating such disturbances. The filter choke coil 35 is therefore, preferably of few turns and of no appreciable resistance. In any case however, it is of such impedance that it may provide with the condenser, an effective filter for the disturbances at any particular frequency.

The filament or heater circuit formed by the lead 23 and the grounded returns therefor, is operated directly from the battery source without interposing any current limiting resistors. The vacuum tube devices in the apparatus and the loud speaker field are, therefore, preferably arranged to operate at the voltage supplied by the battery 7, which is usually substantially 6–8 volts.

The anode or plate supply lead 26 is provided with operating potential from the same battery source, and is energized through the vibrator lead 33 and the high voltage supply means which includes a vibrator-rectifier unit indicated at 37, a step-up transformer indicated at 38, and electrical circuit filter means indicated as two units, 39 and 40, and as a separate radio or high frequency choke coil 41.

The construction of the vibrator unit per se is shown, described and claimed in a copending application of Emil C. Guedon, Alexander D. Burt, and Frederic Shoup, Serial No. 713,324, filed February 8, 1934, assigned to the same assignee as this application, and now Patent No. 2,063,311.

The vibrator-rectifier unit comprises an armature 42 which is caused to vibrate under the action of a suitable operating electromagnet 43 controlled by operating contacts 44 connected in circuit between the electromagnet 43 and a ground lead indicated at 45, whereby it is connected with the grounded, and in this case, negative, lead of the battery. The other or positive supply lead for the electromagnet is indicated at 46. It will be noted that this is not grounded and is connected as a branch lead with the lead 33 through the filter 39, which will hereinafter be described. Operating current from the battery is supplied through the electromagnet 43 and the contacts 44 to the ground and is returned to the battery.

Two sets of fixed vibratory contacts 47 and 48 are arranged to operate in connection with contacts 47a and 48a carried by the armature, to alternately connect the terminals of the secondary 49 and the primary 50 with ground through the armature 42. For this purpose, the contacts 47 and 48 are connected respectively with the terminals of the secondary 49 and the primary 50 of the transformer 38, as indicated. The primary and secondary windings of the transformer are of the balanced or full-wave type, being preferably center-tapped as indicated at 51 and 52, respectively. The center tap 51 is utilized as a power input terminal from connection with the battery positive or "hot" supply lead 33, through the lead indicated at 53, and the filter unit 39, the lead 53 being not grounded.

The center tap 52 on the secondary winding 49 provides the high potential output terminal of the vibrator-rectifier unit and is connected with the high voltage positive "B" supply lead 26 through a suitable audio and high frequency filter indicated at 40 and a second filter choke coil 41. The filter 40 comprises the usual audio frequency choke coil indicated at 54 and suitable filter bypass condensers 55 connected with the ground. This filter is preferably enclosed in a suitable grounded shielded container indicated by the dotted outline. It will be noted that the audio frequency filter is connected between the anode or plate supply lead 26 and the high potential output center tap terminal 52 directly adjacent to the terminal 52 in the high potential output circuit.

It will further be noted that the audio frequency filter is of the capacity type having one of the filter condensers 55 connected across the high voltage output circuit preceding the choke coil 54.

The shunt filter condenser is therefore connected directly across the load circuit without any appreciable impedance between it and the transformer. It has been found that this connection is effective in further reducing the tendency for sparking at the contacts as distinguished from a filter having an inductance as the first element thereof. A condenser type filter is at present preferred.

The audio frequency filter is followed by a high frequency filter means indicated by the high frequency choke coil 41.

The filter unit 39 is for the purpose of lowering the amplitude of disturbances at the interfering frequencies, and comprises a high frequency choke coil 56 in the supply lead 33, more adjacent to the battery source, followed by a filter bypass condenser to ground 57, of relatively high capacity, and a high frequency bypass condenser to ground, indicated at 58, more adjacent to the vibrator rectifier.

The operation of the system is as follows: The radio receiver is energized by closure of the switch 32 which permits filament heating current to flow through the supply lead 23 and the various tubes, as well as to the loud speaker field, with a return path to the battery through the ground. Simultaneously with the excitation of the filament or heaters and the field of the loud speaker, the vibrator 37 is put into operation by energization of the buzzer magnet 43, the armature vibrating at a predetermined frequency in response to opening and closing of the contacts 44. The operating current for the vibrator flows through the supply lead 33, the filter 39, the lead 46, to the magnet 43, and back to the battery through the contacts 44, armature 42, and the ground lead 45.

The opening and closing of the contacts 47—47a swerve alternately to energize each half of the primary winding 50. The current flows in common with the vibrator current through the branch lead 53 and center tap 51, thence alternately through each half of the primary winding, the contacts 47 and 47a, and returns to the battery through the armature 42 and the ground lead 45.

It will be seen that by operation of the contacts 47—47a, each half of the primary winding is alternately energized through the center tap 51. At the same time, the current induced in the secondary winding 49 flows alternately from each half of the winding toward the center tap 52 to which the positive lead 26 connects, as each half of said winding is alternately connected to ground through the contacts 48—48a. While a reversal of the flow of current in the primary winding is thus effected, the operation is such that the current impulses in the secondary winding are in the same positive direction toward the terminal 52 of the secondary winding. A pulsating direct current is thereby delivered to the terminal 52 and is suitably smoothed for use in the plate and other circuits of the receiver by the filter 40.

For suppressing the spark at the contacts and for filtering purposes, condensers are connected across each of the pairs of contacts 47 and 47a as indicated at 59, and a resistor 60 is connected across the contacts 44. The resistor 60 is effectively in shunt to the contacts 44 to absorb the operating spark or energy caused by the opening or closing of the contacts 44, while the condensers 59 are effectively arranged to tune the primary winding 50 whereby the contacts 48—48a are opening and closing at substantially the zero difference of potential point of each half cycle, thereby substantially eliminating sparking at the secondary contacts. The primary contacts 47—47a likewise open and close during the zero potential difference point because of the coupling between the transformer windings. Therefore, with condensers of a value to tune the secondary, no sparking occurs at either set of contacts.

It has been found that the length of the airgap determines to an appreciable degree the condenser size and that the secondary winding may be tuned to a frequency so related to the frequency at which the connections at the contacts are made, and for the duration of said connections with the winding terminals, that the connections are made at substantially zero difference of potential between the contacts when they are just opening and just closing, that is, when opening and closing.

Stated in other words, the voltage existing across the secondary winding, for example, is substantially the same before and after the contact break and of the same polarity. The voltage preceding contact make is substantially equal to or less than the voltage following contact make. This arrangement provides a relation between the frequency of vibration and the time spent in contact so that the voltage between the contacts shall not produce ionization of the air in the space between the contacts, By providing the condensers 59 across the secondary between each terminal lead therefrom and to ground, the condensers may be of comparatively low capacity, while at the same time maintaining an effective load on the primary. It has further been found that it is necessary to include the condensers 59 within the shielded container 37 for the vibrator circuit, even though the transformer may be located in spaced relation to the rectifier. It is for this reason that the condensers 59 are located in the rectifier unit as shown diagrammatically in the drawing, with a ground connection, as indicated, to the ground lead 45 for the unit.

It has been found that the condensers may be connected with the terminals of the primary winding of the transformer in a similar manner, but that relatively high capacity values are required if the condensers are connected with said primary winding. Therefore, the connection, as shown, is at present preferred.

It will further be noted that in accordance with the diagrammatic showing in the drawing, opposite halves of the secondary and primary windings 49 and 50 are approximately simultaneously connected to ground through the closure of the contacts 47, 47a, 48 and 48a of the vibrator-rectifier unit. This is for the purpose of providing positive polarity for the output current from the terminal 52.

If the polarity of the primary source is reversed from that shown in the drawing, as in an automobile installation wherein the positive and not the negative lead is grounded, the secondary terminal leads are reversed to maintain the center tap as the positive output terminal. However, the primary terminal leads instead may be reversed for the same purpose, if desired.

The current set up in the primary of the transformer serves to produce a higher voltage in the secondary 49 since the transformer is provided with a step-up ratio from the primary to secondary. The step-up ratio is sufficient to provide a desired potential at the high potential output terminal or lead 26. For example, in a present embodiment of the invention, the voltage provided is substantially 270 volts, direct current, from a 6 volt direct current applied at the supply lead 13.

The transformer should be of such design that the exciting current is low at all times relative to the load current. Furthermore, in maintaining a low exciting current, the transformer should preferably operate at a point well below the knee of the saturation point at the normal battery supply voltage. This is particularly important in connection with automobile radio receivers for the reason that the supply voltage may often rise as high as 10 volts, with a corresponding increase in the saturation of the transformer core. If this saturation approaches the knee, the exciting current impulses may reach excessively high values and necessitate a relatively heavy condenser load on the secondary or the primary winding to absorb the energy which would otherwise cause excessive sparking at the contacts, that is, to counteract the lowering of the inductance caused by the saturation.

Accordingly, in connection with such battery supply systems, it has been found that the transformer should be provided with a primary having a relatively high inductance whereby it may operate with relatively low exciting current under all conditions which may be experienced with increases in the supply voltage.

The choke coil 35 and by-pass condenser 36, located as shown, provide a high frequency filter for removing from the filament heating circuit any of the ultra high frequency waves generated by the vibrator and which would tend to be transmitted to the radio apparatus connected with the filament heating circuit. By way of example, it has been found that a small solenoid winding of 3 to 20 spaced turns of a diameter somewhat less than 1", together with a filter condenser of 60–2400 micro-microfarads capacity has successfully eliminated ultra high frequency interference from a receiving system as shown.

Likewise, in the opposite branch lead 33 for the vibrator system is also interposed a choke coil and condenser filter combination 56, 57 and 58, respectively. In the present example, a condenser 58 may be substantially the same value as the condenser 36 and the coil may have approximately 50 turns on a small diameter form, such as a fraction of one inch. This filter serves to prevent vibrator signals within the broadcast and high frequency ranges from reaching the automobile chassis wiring through the power connection and is, at the same time, interposed between the vibrator-rectifier and the filament circuit thereof to further prevent interference in the broadcast and high frequency range from reaching the filament heating circuit.

In addition to the condenser 58 there is also provided a filter condenser 57 for absorbing other high frequency pulses resulting from operation of the vibrator, and as a smoothing means for the system. This condenser may have a relatively high value such as .5 microfarad.

For ultra high frequency signals generated by the vibrator, the condenser 58 also cooperates with the choke coil 35 as a filter means for preventing such signals from reaching the filament heating circuit 23. It should also be noted that since the ultra high frequency filter provided by the choke coil 35 and condenser 36 is interposed between the heating circuit 23 and the supply lead 13, the filter also effectively prevents ultra high frequency disturbances from the ignition apparatus from reaching the said circuit 23, whereby the circuit is further protected from such interference.

It has also been found that more quiet operation is obtainable by placing the filter choke coil 41 adjacent to the receiver, with the audio frequency filter 40 adjacent to the transformer 38 and the high voltage tap 52. In this way the audio frequency filter 40 is followed in the potential output circuit by the higher frequency filter provided by the choke coil 41. It has been found that this filter may be provided by a choke coil of 250 turns, universally wound.

It will be noted that the filter 40, the rectifier unit 37, and the transformer 38 are all provided with shielding which is grounded. In an automotive vehicle, the ground is, of course, made to the chassis or frame thereof. The shielding for the transformer 38 may take the form of a unit shield indicated at 38a or a shield between it and the radio receiver such as that indicated at 6a and hereinbefore referred to.

Tracing the supply circuit from the source or battery 7, it will be seen that the power switch 32 is connected in circuit through a shielded extension lead, and that the lead then enters a completely shielded apparatus, including in turn separate and shielded units all grounded to the chassis. Furthermore, it will be seen that a supply lead is then branched and leads out to a filament heating circuit and loud speaker field in one branch through an ultra high frequency filter, and through the operating unit to another branch and a high frequency filter to which is added a smoothing filter. The filament heating, field, and vibrator circuits all return to the battery through the ground, each half of the primary winding being alternately connected in circuit by the operation of the contacts 46 and 46a. Two high frequency filters are therefore interposed between the vibrator and the filament heating circuit and one between the vibrator and the source 7 and the connected wiring about the automobile chassis.

It will, therefore, be noted that there is also interposed between the vibrator and the supply circuit for the radio apparatus, a pair of series connected filters similar to that interposed in the filament circuit.

Through the medium of the transformer 38, the plate supply circuit is separated from the power supply circuit and the chassis wiring of the automobile, and through operation of the contacts 47 and 47a each half of the secondary is alternately connected to ground, thereby providing a separate output circuit from the input circuit of the power supply system.

From the foregoing description it will be seen that the vibrator-rectifier system supplies both anode and grid potentials to the circuits of the radio apparatus, and that in order that the apparatus may function properly, the potential supply must be steady. This is particularly true if a loud speaker is employed, as in the usual automobile radio receiver, for example.

In addition to the proper filtering of the circuits of the supply system at points and in a manner which has been found to be most effective as hereinbefore described, it will be noted that a full wave rectifier action is obtained by providing both the primary and the secondary of the power transformer with a tap between its terminal ends. In the present embodiment, the tap is provided at the center of each winding, and by connecting the terminals of each winding to the contacts of the vibrator, the vibrator arm and the center taps of the windings are utilized as sources of input and output voltages.

The vibrator arm is preferably common to both the primary and secondary circuits and represents any suitable means for alternately connecting first one half and then the other half of each winding in circuit. Thus in operation, the primary vibrator contacts function to connect the input low voltage current from the battery first across one half and then across the other half of the primary of the transformer. This results in a pulsating direct current applied to the primary in an alternating direction, and causes the flux in the transformer core to vary from a positive to a negative value periodically. The alternating current voltage set up in the secondary of the transformer is rectified by the operation of the secondary contacts which operate in synchronism with the primary contacts. The transformer has a step up ratio whereby the secondary voltage is considerably greater than that of the primary, as has been hereinbefore pointed out.

The transformer may also be utilized as a material aid in reducing sparking without the use of excessively large absorbing condensers for the reason that, as also hereinbefore pointed out, the primary of the transformer may have a relatively high inductance so that it may be operated well below the knee of the saturation curve. For that reason the secondary condensers may further be reduced in size, and hence in cost.

The secondary vibrator contacts function in a similar manner to those on the primary side and serve to reverse the alternations applied to the secondary of the transformer and the load, whereby a pulsating high voltage direct current is obtained from the secondary center tap.

By tuning one of the transformer windings, the transformer may be properly loaded or phased to permit the contacts to open and close at substantially zero potential difference, whereby sparking is effectively eliminated. The rectifying contact changes are then made in approximate synchronism with the points of zero potential difference between the contact means. As has been hereinbefore pointed out, the secondary is the preferred winding for the reason that the condensers employed for tuning or loading may be of relatively low capacity.

In effect, the output or load circuit is provided with a condenser load which is applied alternately to each half of the secondary to load it at the frequency of operation, which is approximately 70 cycles in the present preferred embodiment of the invention.

The output or load circuit is further provided with a condenser load forming the input element of the low or audio frequency filter. As has hereinbefore been pointed out, the condenser type of filter is preferred for the reason that an initial condenser in shunt to the output or load circuit is presented to the output current from the transformer. In any power supply circuit, in case a filter of the type shown is unnecessary, then in any case it is preferable that the load circuit is shunted by a relatively large filter condenser adjacent to the output terminals of the power supply means in the load circuit, without the interposition of any circuit element having an appreciable impedance to current flow.

The condenser load for the output or load circuit is connected between the load circuit lead from the secondary center tap and the return lead or ground. The other loading condensers for the output circuit or secondary for loading or tuning the secondary winding to effectively neutralize for the exciting current of the transformer, are connected between the terminals of the secondary each to the load circuit return lead or ground, whereby said condensers are, in effect, connected in series with a center tap connection to ground. The condensers may, therefore, be of relatively low capacity and since they are in series, they may be of a lower voltage rating and cost.

It has also been found that this series center tap connection for the loading condensers materially aids in the prevention of radio or high frequency interference through the output or load circuit, from faulty commutation or operation of the rectifier contacts.

The power supply system as a whole comprises a few low-cost units, each being easily replaceable and so disposed in circuit that interference from operation of the contacts is prevented from reaching the utilization or tube circuits connected with it.

Referring now to Fig. 2, the solid line curve indicated at 60 represents the appearance of an oscillograph voltage wave taken across the contacts 46 and indicates the voltage wave shape resulting from operation of the system. It may be taken as representing the secondary voltage taken across the contacts 47.

It will be noted that the wave is substantially flat topped and that it has substantially straight parallel sides.

The operation of the contacts may be described by starting with a point A on the curve at which time the armature contacts 47a and 48a have just opened contact with the corresponding primary and secondary contacts 47 and 48. The contacts remain open while the armature is traveling across the gap over the curve from the point A to the point B where the contacts 47a and 48a close in the opposite direction. The voltage wave immediately reaches the point C in a maximum positive direction and the voltage wave remains at that value until the contacts again open at the point D.

The points then remain open over the curve from the point D to the point E when they close again in the same direction as they were up to the point A, and the voltage immediately reaches a maximum negative value F, which it retains until the point G is reached, when the contacts again open and remain open over that period represented by the curve between the points G and H.

The portions of the curve between points A and B, D and E, and G and H, for example, represent portions of a damped voltage wave or oscillation in each instance, the length of which is determined by the inductance of the transformer winding and the capacity of the shunt condenser arrangement. These oscillations are cut off by the closing of the contacts at the points B, E, and H in the curve diagram shown.

As the vibrator rectifier unit continues in use over an extended period of time, the contacts wear gradually and cause the air gap between them to widen. This has been found to change the period of time over which the contacts are open but not to change appreciably the period of time during which the contacts are closed. This causes the curve 60 gradually to assume the shape shown by the dotted curve 61. During this change the point E, for example, gradually moves down the slope of the curve DE until it crosses the zero axis and finally reaches a point such as K, at which time, it has been found that the device may become defective in operation because of instability. During this time, the point E, for example, at which the contacts close, may be substantially at or adjacent to a zero axis representing a zero difference of potential between the contacts as they close. In order to provide this operating condition over an extended period, the condensers 59 are initially provided with a slightly excessive value so that the point E and the corresponding points B and H, for example, are slightly spaced from the zero axis.

It will be noted that, as the curve 60 gradually widens to assume the form of the curve 61, the same flat top characteristic is maintained with substantially straight sides. The form of the curve is therefore at all times substantially a "square" wave.

It will also be noted that the corners of the curve at C and D, for example, are slightly rounded because of the contact and secondary resistance in the circuit.

We claim as our invention:

1. A power supply system for radio receiving apparatus and the like including in combination, a transformer having primary and secondary windings each provided with a tap between the terminal ends thereof, a high voltage output lead connected with the secondary tap, an audio frequency filter means in said lead adjacent to said tap, a low voltage supply lead connected with the primary tap, a cathode circuit forming a branch connection with said lead, high frequency filter means interposed in each of said branch connections whereby said filter means are connected in series between said primary center tap and said cathode circuit, means providing returns for said low voltage supply and high voltage output leads, and vibratory contact means having reversing contacts connected with the terminals of said transformer windings for simultaneously connecting one of the terminals of each of said windings with the circuit return means therefor.

2. A power supply system for radio receiving apparatus and the like including in combination, a transformer having primary and secondary windings each provided with a tap between the terminal ends thereof, a high voltage output lead connected with the secondary tap, an audio frequency filter means in said lead adjacent to said tap, a low voltage supply lead connected with the primary tap, a cathode circuit forming a branch connection with said lead, a high frequency filter means interposed in each of said branch connections whereby said filter means are connected in series between said primary center tap and said cathode circuit, means providing circuit returns for said low voltage supply and high voltage output leads, vibrator means having a common vibratory arm contact and reversing contacts connected with the terminals of said transformer windings for simultaneously connecting one of the terminals of each of said windings with the circuit return means therefor, electrical shield means for said vibrator means, and a pair of condensers included within the shielding of said vibrator means providing separate alternating current paths between a pair of secondary contacts and the common vibratory arm contact therefor and said shield means.

3. A power supply system for radio receiving apparatus and the like including in combination, a transformer having primary and secondary windings provided with power input and output taps, respectively, between the terminal ends thereof, an output filter means connected with the secondary tap, a low voltage battery supply lead connected with said primary tap, a cathode supply circuit forming a branch connection therewith, a high frequency filter means interposed in each of said branch connections whereby said filter means are connected in series between said primary center tap and said cathode circuit, vibrator means having contacts connected with the terminals of said transformer windings for connecting the terminals of each of said windings alternately to ground, the filter means in the cathode supply circuit comprising a high frequency choke coil of relatively few turns, and said filter means in the branch lead for said primary tap comprising a choke coil followed in the direction of current flow by a bypass condenser to ground, of relatively high value.

4. The combination with a radio receiving system having a cathode supply circuit and an anode supply circuit, of means for supplying operating current to said circuits from a single common low voltage source, said means comprising a supply lead for connection with said source, a step-up transformer having primary and secondary windings each provided with a tap, branch circuits connecting said supply lead with the primary tap and with the cathode supply circuit, each of said branch circuits including high frequency filter means, a high voltage output circuit connected with said secondary tap, low frequency filter means interposed in circuit between said output circuit and the secondary tap, a vibrator device having an operating winding connected through one of said filters with the supply lead, said device having contacts connected with the terminals of said transformer windings and having an armature providing contacts movable therewith to alternately connect portions of said windings on opposite sides of said taps alternately operatively in circuit, and a pair of condensers serially connected between the contacts for one of said transformer windings and having a connection between the junction of said condensers and the armature to provide a tuning and high frequency filter means on said transformer.

5. In an automotive vehicle having distributed supply wiring and a low voltage battery source of power connected therewith, of means for supplying operating current to radio receiving apparatus from said source without accompanying electrical disturbances from operation of the vehicle, said means comprising an electrical shield for radio apparatus, a step-up transformer within said shield, a vibratory contact device within said shield, for alternately connecting the terminals of said transformer windings with said shield, means for supplying filtered electrical current from said source to a tap on one of said windings, and means for supplying filtered electrical current from a tap on another of said windings to said apparatus, a filament supply circuit connected with said source, an ultra high frequency filter in said circuit, a pair of electric tuning condensers connected in series across one of said transformer windings, and means providing a connection between the junction of said condensers and said shield.

FREDERIC SHOUP.
ALEXANDER D. BURT.